United States Patent [19]

Beneker et al.

[11] 4,091,841

[45] May 30, 1978

[54] PRESSURE PLUG AND METHOD

[75] Inventors: Claus Beneker, Santa Ana; Stanley G. La Salle, Costa Mesa, both of Calif.

[73] Assignee: Bertea Corporation, Irvine, Calif.

[21] Appl. No.: 705,077

[22] Filed: Jul. 14, 1976

[51] Int. Cl.² ........................ F16L 55/10; F16L 55/18
[52] U.S. Cl. ........................................ 138/89; 138/97; 29/401 C; 29/401 D; 29/522 R; 85/72; 85/79
[58] Field of Search .................... 29/522, 510, 401 D, 29/401 C; 138/89, 97; 85/72, 79, 83

[56] References Cited

U.S. PATENT DOCUMENTS

| | | | |
|---|---|---|---|
| 2,754,703 | 7/1956 | Huck | 29/510 |
| 3,491,649 | 1/1970 | Smouton et al. | 85/72 |
| 3,525,365 | 8/1970 | Meulendyk | 138/89 |
| 3,691,609 | 9/1972 | Ice et al. | 138/89 X |

*Primary Examiner*—Charlie T. Moon
*Attorney, Agent, or Firm*—Gordon L. Peterson

[57] ABSTRACT

A pressure plug comprising a radially expandable sleeve and an inner member within the sleeve. The sleeve has a tapered passage extending in a generally axial direction through the sleeve. The inner member includes a plug, an installation pin, and a breakable section joining the installation pin to the plug. The plug has a tapered outer peripheral surface. To install the plug in a passage of a body, a tension force is applied to the installation pin to tightly wedge the plug within the sleeve and to radially expand the sleeve into sealing tight engagement with the wall of the passage in the body. When the tension force reaches a predetermined magnitude, the breakable section breaks to prevent the application of excessive force to the pressure plug and the body in which it is installed.

18 Claims, 4 Drawing Figures

PRESSURE PLUG AND METHOD

BACKGROUND OF THE INVENTION

It is sometimes necessary to plug holes formed in fluid-carrying bodies. For example, manifolds used in hydraulic control systems often have holes which must be sealed to prevent fluid from leaking into or out of the fluid-carrying body.

One prior art device employed for hole closure purposes is known as the Lee plug and includes a plug having a tapered axial hole extending part way through the plug and a tapered pin. The plug, which has its inner end closed, is slipped into a counterbore of the passage to be sealed until its inner end engages the shoulder of the counterbore. The tapered pin is then pounded or pressed into the hole in the plug to expand the plug radially into sealing tight contact with the wall of the counterbore.

One problem with this construction is that the use of a hammer or press to drive the tapered pin into the plug does not provide adequate control over the forces on the plug or the fluid-carrying body during installation. This can lead to structural failure during installation or to undesirable residual stresses. The need for a counterbore and a shoulder in the fluid-carrying body is also undesirable because it requires an additional work operation. In addition, the diameter of the counterbore is larger than the diameter of the remaining portion of the passage to be sealed, and this is undesirable because, when the counterbore is formed in a boss, it reduces the wall thickness of the boss thereby reducing its strength. The wall thickness of the boss can be enlarged, but this adds a weight and size penalty which is extremely undesirable for aircraft applications.

A second prior art pressure plug includes a sleeve open at both ends and a tapered plug. The sleeve has a tapered bore, and the tapered plug has a threaded socket at the small diameter end thereof. To install this pressure plug, the sleeve is placed in the passage to be sealed and a threaded pulling tool is threaded into the socket of the plug. With the sleeve suitably restrained against axial movement, the plug is forcibly pulled into the tapered bore of the sleeve to seal the interfaces between the plug and the sleeve and between the sleeve and the wall of the passage to be sealed. The tapered surfaces of the plug and sleeve are arranged so that they taper radially inwardly as they extend toward the outer end of the passage to be sealed.

Unfortunately, this prior art device also does not provide for accurately and positively controlling the forces of installation. In addition, the wall defining the threaded socket in the plug may be deformed radially inwardly as a result of installation thereby making the removal of the installation tool from the plug somewhat difficult. The threaded socket in the plug may also tend to reduce the effectiveness of that portion of the plug in forcing the sleeve radially outwardly.

SUMMARY OF THE INVENTION

The present invention provides a pressure plug in which the forces of installation are accurately controlled and automatically prevented from exceeding a predetermined maximum. This is accomplished by utilizing a frangible or breakable section to install the plug within the sleeve. The breakable section breaks when a predetermined installation force is applied thereby accurately establishing the installation force.

This can be accomplished by a radially expandable sleeve having a tapered passage and an inner member within the tapered passage. The inner member includes a plug and an installation section joined to the plug. At least a portion of the plug is tapered for cooperation with the tapered passage of the sleeve. The installation section is joined to the plug so that a tension force can be applied to the installation section to relatively axially advance the plug in the tapered passage to radially expand the sleeve.

Preferably both the outer surface of the plug and the passage in the sleeve taper. However, for some applications, it may be possible to taper either the plug or the passage in the sleeve.

The inner member also includes breakable means responsive to a tension load of a particular magnitude on the breakable means to break to allow at least a portion of the installation section to be separated from the plug. Although the breakable means may be located at various different locations, it can advantageously be used to join the installation section to the plug. The breakable means may be formed in many different ways, but preferably the inner member is integral and the breakable means is a breakable section of reduced cross-sectional area.

The pressure plug of this invention can be installed in passages of many different kinds of fluid-carrying bodies. Preferably, the plug and the passage of the sleeve taper radially inwardly as they extend axially outwardly in the passage to be sealed. With this arrangement, internal pressure within the fluid-carrying body tends to seat the plug more tightly.

To provide for a fluid-tight seal, the sleeve is preferably constructed of a softer material than the plug. Thus, the plug does not deform as readily as the sleeve. The plug is basically a solid member, and it does not have any large recesses which would tend to weaken the plug against radial inward loads. Preferably the plug and sleeve are constructed of materials which have substantially the same coefficients of thermal expansion. This prevents temperature changes from tending to loosen the plug and sleeve.

To further seal the interfaces, it is desirable to provide annular ribs on the outer peripheral surface of the plug. Similar ribs can be provided on the outer peripheral surface of the sleeve. These ribs bite into the adjacent surfaces as the pressure plug is being installed to assist in forming a fluid-tight seal. The ribs also help hold the plug in the sleeve, and this is of particular advantage if the direction of the differential pressure acting on the plug reverses.

To facilitate installation of the pressure plug, the inner member is preferably longer than the sleeve so that the installation section projects axially from the outer end of the sleeve. Although the installation section can be gripped in various different ways, one desirable way is to externally groove the installation section so that it can be gripped by a conventional tool which is used for swage pin installation. Alternatively, the external grooves may be in the form of screw threads.

To install the pressure plug, it is necessary to pull on the installation section. Because of the tapered surfaces on the plug and the sleeve, at least some of this pulling force is transmitted to the sleeve. To prevent the sleeve from being pulled out of the passage to be sealed during installation, it is necessary to restrain the sleeve against this pulling force. With the present invention, the same tool which is utilized to apply the pulling force can also be used to restrain the sleeve against the pulling force. Specifically, pulling on the installation section with the tool provides a reaction force on the tool, and this reaction force is used to prevent withdrawal of the sleeve from the passage to be sealed.

It is also necessary to axially position the sleeve within the passage to be sealed. With the present invention, this can also be accomplished by the same tool which is used for applying the pulling force to the installation section.

Both the sleeve positioning and sleeve restraining functions can be accomplished by a pulling tool having a shoulder and a projection projecting from the shoulder. The projection is inserted into the passage of the body until the shoulder rests against the external surface of the fluid-carrying body. The sleeve is positioned axially within the passage to be sealed by the engagement of one end of the sleeve and the projection of the tool. By selecting tools having projections of different lengths, the axial position of the sleeve within the passage to be sealed can be selected. This engagement between the sleeve and projection also holds the sleeve in the passage to be saled as the plug is being pulled.

The invention, together with further features and advantages thereof, can best be understood by reference to the following description taken in connection with the accompanying illustrative drawing.

DESCRIPTION OF THE PREFERRED EMBODIMENT

Figure 1:
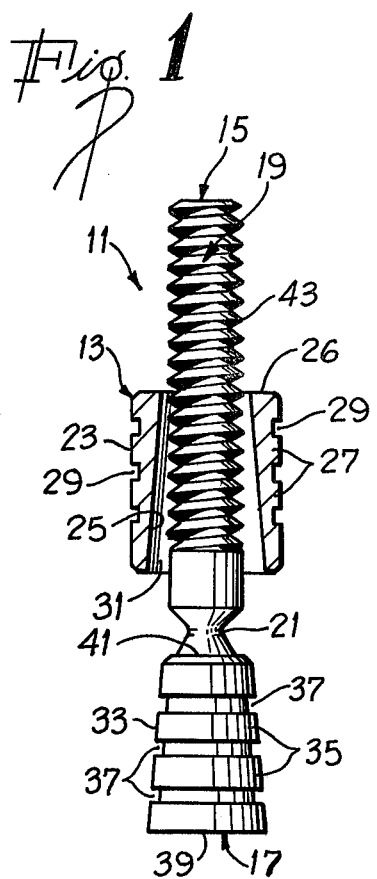
FIG. 1 is an elevational view partially in section of a pressure plug constructed in accordance with the teachings of this invention.

FIG. 1 shows a pressure plug 11 which generally comprises a sleeve 13 and an inner member 15. The inner member in turn includes a plug 17 and an installation section 19 joined by a breakable section 21.

The sleeve 13 has an outer peripheral surface 23, an inner peripheral surface 25, and an outer end 26. The outer peripheral surface 23 has a plurality of annular ribs 27 which are axially spaced by annular grooves 29. The outer peripheral surface 23 is basically cylindrical, although the cylindrical contour is interrupted by the annular grooves 29.

The inner peripheral surface 25 defines an axial passage 31 which extends completely through the sleeve 13. Although only a portion of the inner peripheral surface 25 may taper, in the embodiment illustrated, the full length of the inner peripheral surface 25 tapers radially inwardly as it extends axially toward the outer end 26. Thus, in the embodiment illustrated, the peripheral surface 25 forms a frustum of a cone.

The plug 17 has an outer peripheral surface 33 which tapers radially as it extends axially so that one end of the plug is of larger cross-sectional area than the other end of the plug. The plug 17 has a plurality of annular ribs 35 which are axially separated by a plurality of annular grooves 37. The outer peripheral surface 33 generally forms a frustum of a cone; however, the contour of the frustom of the cone is broken by the grooves 37. The ribs 23 and 35 can be eliminated, if desired.

The plug 17 is completely solid except for the indentations formed by the annular grooves 37. The plug 17 has a free end 39 and an end 41 which has less area than the end 39 and which is integrally joined to one end of the breakable section 21. The other end of the breakable section is integrally joined to the installation section 19. Thus, in the embodiment illustrated, the inner member 15 is integral; however, it can be constructed of multiple pieces if desired. Similarly, the breakable section 21 can be located anywhere along the inner member 15 so long as at least some of the plug 17 is available for plugging and sealing purposes. Although the breakable section 21 can take many different forms, in the embodiment illustrated, it is formed by reducing the cross-sectional area of a region of the inner member 15. The plug 17, the installation section 19, and the breakable section 21 are coaxial, however, other orientations can be used, if desired.

The installation section 19 is in the form of an elongated pin having external grooves which, in the embodiment illustrated, are in the form of screw threads 43. The inner member 15 is longer than the sleeve 13.

The angles of the tapered surfaces 25 and 33 will ordinarily be relatively small and are preferably small enough so that a sticking wedge action is obtained. By way of illustration, and not by way of limitation, the angle of the surfaces 25 and 33 formed with respect to an axially extending line may be of the order of one degree of one-and-one-half degrees. The angles of the surfaces 25 and 33 may be the same or different.

The sleeve 13 must be constructed of a material which will permit the sleeve to radially expand. It is also preferred to have the outer peripheral surface 33 of the plug 17 harder than the inner peripheral surface 25. The sleeve 13 and the plug 17 can be constructed of various different matrials, such as steel and aluminum alloys. However, aluminum alloys, having subtantially the same coefficients of thermal expansion, are preferred.

Figure 2:
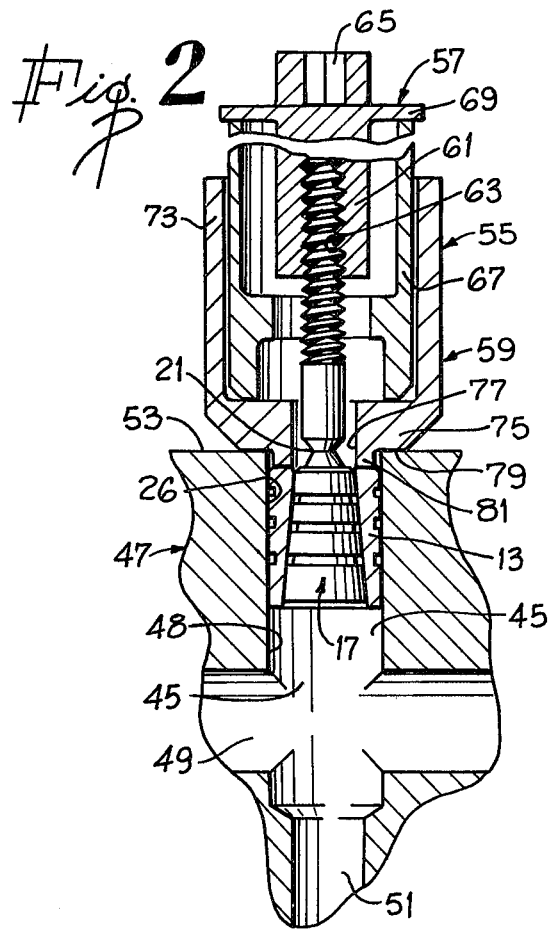
FIG. 2 is a fragmentary sectional view showing the installation of the pressure plug in a passage to be sealed.
Figure 3:
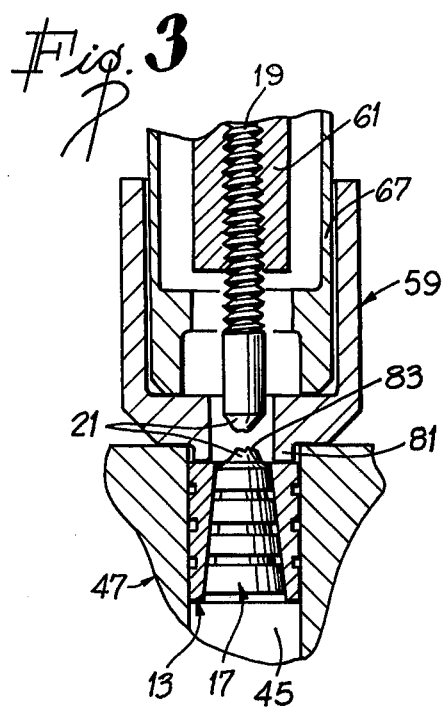
FIG. 3 is a fragmentary sectional view similar to FIG. 2 after the breakable section has fractured.

FIGS. 2 and 3 illustrate how the pressure plug 11 can be installed. As shown in FIG. 2, the pressure plug 11 is installed in a passage or bore 45 of a fluid-carrying body in the form of a manifold 47. The bore 45 in the embodiment illustrated is cylindrical and it is defined by a cylindrical wall 48. The manifold 47 has a cavity in the form of hydraulic passages 49 and 51 for the passage of hydraulic fluid therethrough. The bore 45 leads from the passages 49 and 51 to a flat external surface 53 of the manifold 47. The bore 45 has an outer end which opens at the external surface 53. The use of the pressure plug 11 is not limited to manifolds such as the manifold 47.

The pressure plug 11 can be installed utilizing a tool 55. In the embodiment illustrated, the tool 55 includes a pulling device 57 and an adapter 59. By way of example, the pulling device 57 may include a nut 61 having an internally threaded bore 63 and an upwardly opening socket 65 for receiving a standard socket wrench. The pulling device 57 also includes a tubular member 67 for receiving the nut 61. The nut 61 has a flange 69 which bears against the upper end of the tubular member 67. Bearings (not shown) can be incorporated into the pulling device 57 to reduce the friction between the flange 69 and the upper end of the tubular member 67. Alternatively, annular grooves may be provided in lieu of the threads 41; in which event a standard pulling device 57, such as a Huck Gun, may be used. This has the advantage of providing for fast loading of the installation section 19 into the pulling device 57.

Although the pulling device 57 may be a standard commercially available unit, the adapter 59 is specially made in accordance with the teachings of this invention. The adapter 59 includes a skirt 73 for receiving the tubular member 67, and end wall 75, and an axial passage 77 extending through the end wall. The outer surface of the end wall 75 forms a shoulder 79 and an annular projection 81 projects axially from the shoulder 79. The projection 81 is sized to be received within the outer end of the bore 45, and the length of the projection 81 determines the position of the sleeve 13 within the bore. The lower end of the tubular member 67 bears against the inner surface of the end wall 75.

To install the pressure plug 11 in the bore 45, the inner member 15 is inserted into the passage 31 of the sleeve 13, as shown in FIG. 1, and the pulling device 57 is inserted into the skirt 73 of the adaptor 59. The installation section 19 is then screwed into the nut 61 by rotating the nut 61. As the nut 61 rotates, the inner member 15 is drawn inwardly of the pulling device 57 until the end 26 of the sleeve 13 engages the end of the projection 81.

With the components assembled in this manner, they are positioned as shown in FIG. 2. Specifically, the sleeve 13 is within the bore 45 and the plug 17 is within the sleeve. The shoulder 79 of the adapter 59 engages the external surface 53 of the manifold 47, and the projection 81 is in the bore 45. The axial position of the sleeve 13 in the bore 45 is controlled by the engagement of the end 26 of the sleeve with the projection 81. Thus, the axial length of the projection 81 controls the axial position of the sleeve 13 in the bore 45.

Figure 4:
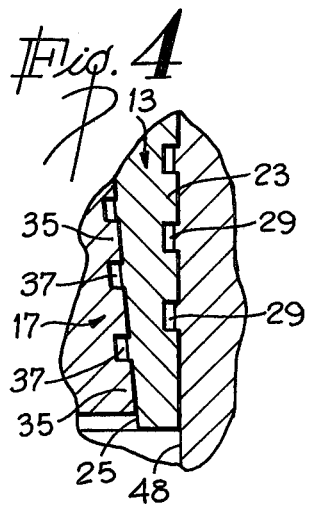
FIG. 4 is an enlarged fragmentary sectional view showing the sealing surfaces of the pressure plug.

To plug and seal the bore 45, the nut 61 is rotated to force the plug 17 into the progressively narrowing passage 31 of the sleeve 13. This wedges the plug tightly in the passage 31 to form an interference fit which seals the interface between the plug and the sleeve. In addition, the plug 17 radially expands the sleeve 13 into tight sealing engagement with the wall 48 to thereby seal the interface between the wall 48 and the sleeve 13. The annular ribs 23 and 33 bite into the surface 25 and the wall 48, respectively, as shown in FIG. 4, to further insure fluid tightness.

As the nut 61 is turned, the installation section 19 is placed in tension and a reaction force is applied to the sleeve 13 through the nut 61, the flange 69, the tubular member 67, the end wall 75, and the projection 81. Thus, the reaction force generated by applying tension to the installation section 19 is used to maintain the sleeve 13 in the position established by the projection 81. Several of the adapters 59, each with a projection 81 of a different length, can be provided to control the axial position of the sleeve 13 within the bore 45.

As the plug 17 is axially advanced within the sleeve 13, the radial force on the sleeve 13 progressively increases. If these radial forces are not properly controlled, the sleeve 13 and/or the material of the manifold 47 surrounding the sleeve may be overstressed, or conversely, insufficient force may be applied, in which event the plug would not be seated as tightly as is necessary. However, with the present invention, the breakable section 21 is carefully controlled to break in response to the application of a tensile force of predetermined magnitude on the installation section 19, which tensile force is in turn calculated so that the proper amount of radial load is applied to the sleeve 13. When this predetermined tensile force is reached, the breakable section 21 breaks, as shown in FIG. 3, to provide the plug 17 with a broken end 83. Thereafter, a workman is unable to apply further installation forces to the plug 17. Accordingly, the present invention provides a foolproof method for assuring that only the proper installation loads will be applied.

Although an exemplary embodiment of the invention has been shown and described, many changes, modifications and substitutions may be made by one having ordinary skill in the art without necessary departing from the spirit and scope of this invention.

We claim:

1. A pressure plug comprising:
   a sleeve having an outer peripheral surface and an inner peripheral surface, said inner peripheral surface defining a passage extending in a generally axial direction through the sleeve whereby the passage is open at both ends;
   at least a portion of said inner peripheral surface of the sleeve tapering radially inwardly as it extends from a first end of the passage toward a second end of the passage;
   said sleeve being radially expandable;
   an inner member including a plug and an installation section joined to the plug;
   said plug having an outer peripheral surface, at least a portion of said outer peripheral surface of the plug tapering radially inwardly as it extends axially from a first end of the plug toward a second end of the plug, the first end of said plug being sized to be receivable into the passage at the first end thereof and moved toward the second end thereof, the outer peripheral surface of the plug being engageable with the inner peripheral surface of the sleeve;
   said second end of said passage being sufficiently open in relation to the size of the first end of the plug so as not to provide a positive stop for the movement of the plug toward the second end of the passage;
   at least one of said outer peripheral surface of said plug and said inner peripheral surface of said sleeve including circumferentially extending ribs to at least assist in forming a fluid-tight seal between the outer peripheral surface of the plug and the inner peripheral surface of the sleeve;
   said installation section being joined to said plug so that a tension force can be applied to the installation section to relatively axially advance the plug toward the second end of said passage to force the outer peripheral surface of the plug against the inner peripheral surface of the sleeve to radially expand the sleeve and to form a fluid-tight seal between the outer peripheral surface of the plug and the inner peripheral surface of the sleeve; and
   said inner member including breakable means responsive to a particular tension load on the breakable means to allow at least a portion of the installation section to be separated from the plug.

2. A pressure plug as defined in claim 1 wherein said installation section includes an elongated pin and said pin has circumferentially extending grooves thereon.

3. A pressure plug as defined in claim 1 wherein the material of said plug has substantially the same coefficient of thermal expansion as the material of said sleeve.

4. A pressure plug as defined in claim 1 wherein said installation section includes an elongated pin having circumferentially extending grooves thereon, said breakable means includes a section of reduced cross-sectional area integrally joining said pin to said one end of said plug, and said plug is constructed of harder material than said sleeve.

5. A pressure plug as defined in claim 4 wherein said outer peripheral surface of said sleeve has a plurality of annular ribs and said sleeve and said inner member are constructed of metal, the material of said sleeve and said plug having substantially the same coefficient of thermal expansion.

6. A pressure plug as defined in claim 1 including circumferentially extending ribs on said outer peripheral surface of the sleeve.

7. A pressure plug as defined in claim 6 wherein said plug is constructed of harder matrial than said sleeve.

8. A combination comprising:
  a body having a cavity therein adapted to contain a fluid and a wall defining a passage leading from said cavity to the exterior of said body, said passage in said body having an outer end opening at the exterior of said body;
  a sleeve having an outer peripheral surface and an inner peripheral surface, said inner peripheral surface defining a passage extending in a generally axial direction through the sleeve whereby the passage of the sleeve is open at both ends;
  said sleeve being in said passage of said body;
  at least a portion of said inner peripheral surface of said sleeve tapering radially inwardly as it extends axially toward the outer end of said passage of said body whereby the passage of the sleeve progressively narrows at it extends axially toward the outer end of said passage of the body;
  a plug having an outer peripheral surface;
  said plug being in said passage of said sleeve;
  at least a portion of the outer peripheral surface of said plug tapering radially inwardly as it extends axially toward the outer end of the passage of the body whereby a first region of the plug is of larger cross sectional area than a second region of the plug;
  said outer end of said passage of the sleeve being sufficiently open in relation to the size of the second region of the plug so as not to provide a positive stop for the plug;
  at least one of said outer peripheral surface of said plug and said inner peripheral surface of said sleeve including circumferentially extending ribs to at least assist in forming a fluid-tight seal between the outer peripheral surface of the plug and the inner peripheral surface of the sleeve;
  said plug being tightly wedged into the passage of said sleeve with the outer peripheral surface of the plug tightly engaging the inner peripheral surface of the sleeve and with the plug holding the sleeve in a radially expanded condition in which the outer peripheral surface of the plug tightly engages the wall of the body which defines the passage in the body; and
  said plug having a broken off outer end which has been broken off from an external member.

9. A combination as defined in claim 8 including annular ribs on the outer peripheral surface of the plug.

10. A combination as defined in claim 8 wherein said plug is constructed of harder material than said sleeve.

11. A combination as defined in claim 8 wherein said plug has an outer end portion which is substantially devoid of an axially-opening cavity.

12. A combination as defined in claim 11 wherein said ribs are on the outer peripheral surface of the plug and the plug is constructed of harder material than said sleeve.

13. A method of sealing a passage in a body wherein the passage is defined by a wall of the body, leads from a cavity in the body to the exterior of the body, and has an outer end opening at the exterior of the body, said method comprising:
  providing a radially expandable sleeve having an outer peripheral surface and an inner peripheral surface with the inner peripheral surface defining a passage extending in a generally axial direction through the sleeve;
  providing an inner member which includes a plug and an installation section with the plug having an outer peripheral surface, at least a portion of at least one of said outer peripheral surfaces of said plug and said inner peripheral surface of said sleeve tapering radially as it extends axially, said installation section having a breakable section;
  placing the plug in the passage of the sleeve and the sleeve in the passage of the body with said portion of said one surface tapering radially inwardly as it extends toward the outer end of the passage in the body and with the installation section projecting out of the sleeve and out of the outer end of the passage of the body;
  pulling on the installation section with a tool in a direction generally axially outwardly of the passage of the body to wedge the plug tightly in the passage of the sleeve and to radially expand the sleeve into tight engagement with the wall of the body which defines the passage of the body to thereby seal the passage of the body, said step of pulling on the installation section providing a pulling force on the sleeve tending to withdraw the sleeve from the passage of the body and providing a reaction force on the tool;
  utilizing at least some of said reaction force to restrain the sleeve against the pulling force;
  continuing said step of pulling until the breakable section breaks to separate at least a portion of the installation section from the plug;
  said tool including a shoulder and a projection projecting from the shoulder and the body having an external surface in which the passage of the body terminates;
  placing the shoulder against the external surface of the body and placing the projection in the passage of the body;
  engaging one end of the sleeve with the projection to axially position the sleeve in the passage of the body; and
  said step of utilizing including passing at least some of the reaction force through said projection to said sleeve for use in counteracting the pulling force on the sleeve.

14. A method as defined in claim 13 wherein said step of placing includes positioning the sleeve axially in the passage of the body utilizing said tool.

15. A method of sealing a passage in a body wherein the passage is defined by a wall of the body, leads from a cavity in the body to an external surface of the body, and has an outer end opening at the exterior of the body, said method comprising:
  providing a radially expandable sleeve having an outer peripheral surface and an inner peripheral surface with the inner peripheral surface defining a passage extending in a generally axial direction through the sleeve;

providing a plug having an outer peripheral surface, at least a portion of at least one of the outer peripheral surface of the plug and the inner peripheral surface of the sleeve tapering radially as it extends axially;

placing the plug in the passage of the sleeve and the sleeve in the passage of the body with said portion of said one surface tapering radially inwardly as it extends toward the outer end of the passage of the body;

providing a pulling tool having a shoulder and a projection projecting from the shoulder;

placing the shoulder against the external surface of the body and placing the projection in the passage of the body;

positioning the sleeve axially within the passage of the body so that one end of the sleeve engages said projection of said tool when said shoulder of said tool engages the external surface;

using said tool to pull the plug in a direction outwardly of the passage of the body to wedge the plug tightly in the passage of the sleeve to radially expand the sleeve into tight engagement with the wall of the body which defines the passage of the body to thereby seal the passage of the body, the pulling on the plug providing a pulling force on the sleeve; and restraining the sleeve against the pulling force.

16. A method as defined in claim 15 wherein said step of pulling provides a reaction force on the pulling tool and the projection and said step of restraining includes restraining the sleeve with said projection.

17. A method as defined in claim 15 wherein said pulling tool includes a pulling device and an adapter, said adapter having said shoulder and said projection, said method including placing the pulling device on said adapter, said step of using includes using the pulling device to pull the plug outwardly in the passage of the body, and said step of restraining includes engaging the sleeve and the projection so that the adapter restrains the sleeve against the pulling force.

18. A method of sealing a passage in a body wherein the passage is defined by a wall of the body, leads from a cavity in the body to the exterior of the body, and has an outer end opening at the exterior of the body, said method comprising:

providing a radially expandable sleeve having an outer peripheral surface and an inner peripheral surface with the inner peripheral surface defining a passage extending in a generally axial direction through the sleeve;

providing an inner member which includes a plug and an installation section with the plug having an outer peripheral surface, at least a portion of at least one of said outer peripheral surfaces of said plug and said inner peripheral surface of said sleeve tapering radially as it extends axially, said installation section having a breakable section;

placing the plug in the passage of the sleeve and the sleeve in the passage of the body with said portion of said one surface tapering radially inwardly as it extends toward the outer end of the passage in the body and with the installation section projecting out of the sleeve and out of the outer end of the passage of the body;

pulling on the installation section with a tool in a direction generally axially outwardly of the passage of the body to wedge the plug tightly in the passage of the sleeve and to radially expand the sleeve into tight engagement with the wall of the body which defines the passage of the body to thereby seal the passage of the body, said step of pulling on the installation section providing a pulling force on the sleeve tending to withdraw the sleeve from the passage of the body and providing a reaction force on the tool;

utilizing at least some of said reaction force to restrain the sleeve against the pulling force;

continuing said step of pulling until the breakable section breaks to separate at least a portion of the installation section from the plug;

said tool includes a pulling device and an adapter, said adapter having a shoulder and a projection projecting from said shoulder;

placing the pulling device on said adapter, the projection in the passage of the body, and the shoulder against the body; and said step of pulling including using the pulling device to pull the installation section, and said step of utilizing including engaging the sleeve and the projection so that the adapter restrains the sleeve against the pulling force.

* * * * *

UNITED STATES PATENT OFFICE
CERTIFICATE OF CORRECTION

Patent No. 4,091,841     Dated May 30, 1978

Inventor(s) CLAUS BENEKER and STANLEY G. LA SALLE

It is certified that error appears in the above-identified patent and that said Letters Patent are hereby corrected as shown below:

Column 6, line 31, change "first" to -- second -- .

Column 6, line 37, change "first" to -- second -- .

Signed and Sealed this

Seventeenth Day of July 1979

[SEAL]

Attest:

LUTRELLE F. PARKER
*Attesting Officer      Acting Commissioner of Patents and Trademarks*